US010451193B2

(12) United States Patent
Freudendahl

(10) Patent No.: US 10,451,193 B2
(45) Date of Patent: Oct. 22, 2019

(54) VALVE ARRANGEMENT, A METHOD FOR IDENTIFYING AN UNDERGROUND VALVE OF A VALVE ARRANGEMENT AND USE OF A USE OF VALVE ARRANGEMENT

(71) Applicant: AVK Holding A/S, Galten (DK)

(72) Inventor: Erling Arnum Freudendahl, Galten (DK)

(73) Assignee: AVK HOLDING A/S, Galten (DK)

( * ) Notice: Subject to any disclaimer, the term of this patent is extended or adjusted under 35 U.S.C. 154(b) by 205 days.

(21) Appl. No.: 15/531,627

(22) PCT Filed: Nov. 28, 2014

(86) PCT No.: PCT/DK2014/050407

§ 371 (c)(1),
(2) Date: May 30, 2017

(87) PCT Pub. No.: WO2016/082833

PCT Pub. Date: Jun. 2, 2016

(65) Prior Publication Data

US 2017/0307103 A1 Oct. 26, 2017

(51) Int. Cl.
*E03B 7/07* (2006.01)
*F16K 37/00* (2006.01)
*E03B 9/02* (2006.01)

(52) U.S. Cl.
CPC ............ *F16K 37/0041* (2013.01); *E03B 9/02* (2013.01); *E03B 7/07* (2013.01); *Y10T 137/6991* (2015.04);

(Continued)

(58) Field of Classification Search
CPC ....... Y10T 137/6991–7021; E03B 7/07; E03B 9/02
See application file for complete search history.

(56) References Cited

U.S. PATENT DOCUMENTS 3,537,471 A * 11/1970 Houle ....................... E03B 9/12 137/370
4,590,963 A 5/1986 Gardner
(Continued)

FOREIGN PATENT DOCUMENTS

DE 102009019984 A1 11/2010
EP 0620327 A2 10/1994
WO 9613639 A1 5/1996

OTHER PUBLICATIONS

Machine translation DE 102009019984.*
(Continued)

*Primary Examiner* — Kevin F Murphy
(74) *Attorney, Agent, or Firm* — Cantor Colburn LLP

(57) ABSTRACT

Disclosed is a valve arrangement for underground control of a fluid flow and an associated method, the arrangement including a valve having a valve housing containing fluid control means for controlling a flow of fluid through pipe means arranged below the surface of the ground, where the fluid control means is actuated by means of mechanical manipulation of an operating device of the valve and the operating device is coupled to the fluid control means, the valve having valve identification means including data regarding the specific valve type, where the valve arrangement further includes an extension device including an extension device housing surrounding an extension rod, where the extension rod is rotatably supported by the extension device housing, where the extension rod is mechanically coupled to the operating device to enable the mechanical manipulation being performed at the ground surface, and the extension device further includes dedicated connection means extending between a valve end and a ground surface end of the extension device, and the valve end is arranged at the valve housing and the ground surface end is arranged at the opposite end of the extension device,
(Continued)

Figure 1:
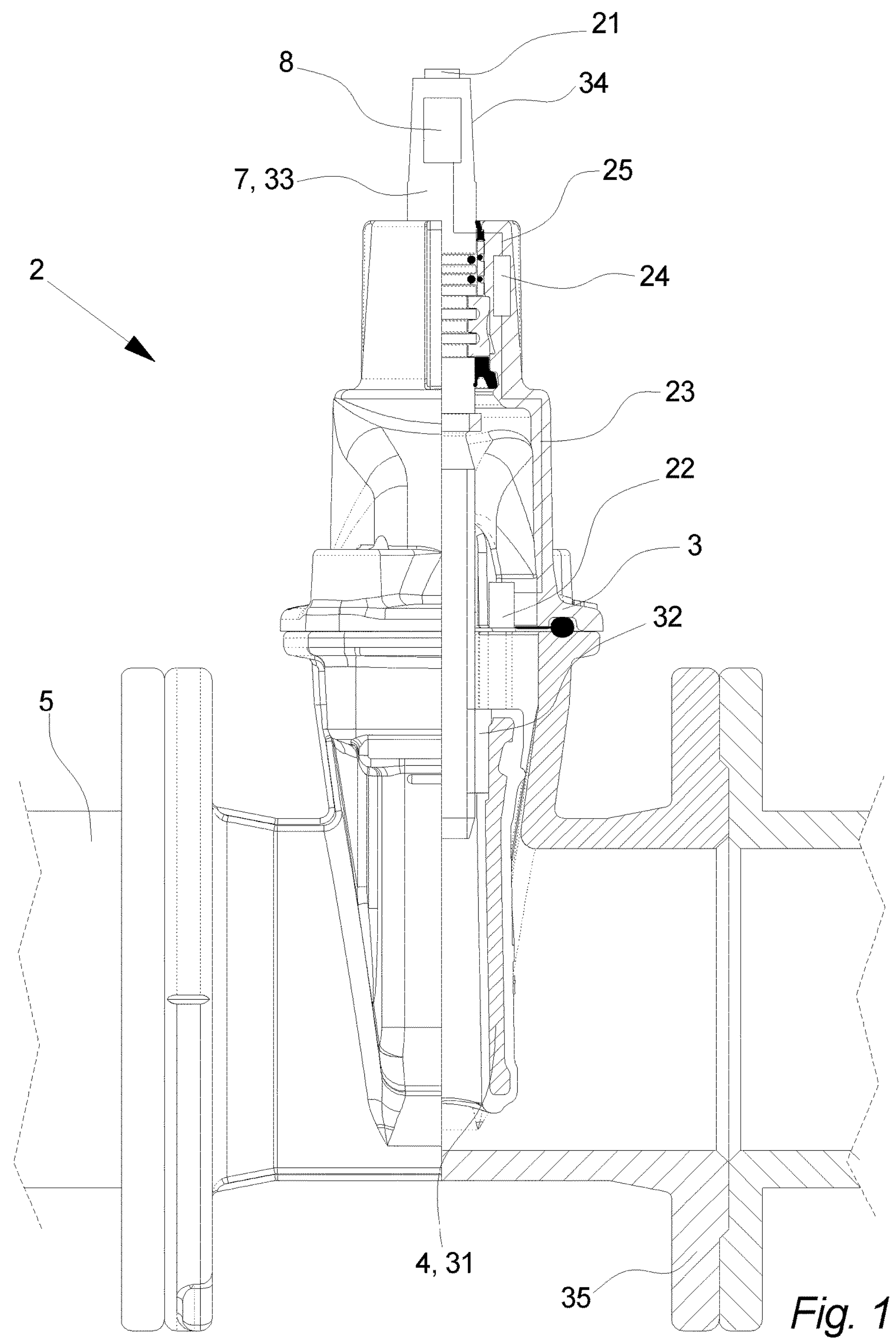

where the dedicated connection means enable that the data regarding the specific valve type may be communicated to the ground surface.

28 Claims, 3 Drawing Sheets

(52) U.S. Cl.
CPC ...... *Y10T 137/6995* (2015.04); *Y10T 137/701* (2015.04)

(56) References Cited

U.S. PATENT DOCUMENTS 5,070,895 A * 12/1991 Kelly ...................... F16K 31/46 137/1
6,009,897 A * 1/2000 Hill ........................... E03B 9/10 137/364
6,460,563 B2 * 10/2002 Olson .................... A01G 25/16 137/364
6,834,662 B1 12/2004 Olson et al.
6,997,201 B2 * 2/2006 Preul ......................... E03F 1/00 137/1
7,726,902 B1 * 6/2010 Bongiovanni ....... B65D 90/105 137/371
8,985,048 B2 * 3/2015 Perin ......................... G09F 3/00 116/209
9,777,457 B2 * 10/2017 Mosley ................. G01F 15/007

OTHER PUBLICATIONS

International Search Report for corresponding application PCT/DK2014/050407 filed Nov. 28, 2014; dated Jul. 30, 2015.
Chinese Office Action for the corresponding CN Application No. 201480083450.X; Filing Date: Nov. 28, 2014; dated Mar. 8, 2019; 13 pages.

* cited by examiner

VALVE ARRANGEMENT, A METHOD FOR IDENTIFYING AN UNDERGROUND VALVE OF A VALVE ARRANGEMENT AND USE OF A USE OF VALVE ARRANGEMENT

TECHNICAL FIELD

The invention relates to a valve arrangement for underground control of a fluid flow. The invention also relates to a method for identifying an underground valve of a valve arrangement comprising an extension device being connected to the valve and use of a valve arrangement.

BACKGROUND

Underground pipe networks are used when distributing e.g. utility water, waste water, central heating, natural gas or other fluids over large areas. To enable that sections of the buried pipe network can be isolated e.g. during repair or fault localisation or simply to control the distribution in the network it is known to provide valves at strategic nodes and other locations in the pipe network.

However, these valves may be in use for several decades and even if the exact type of valve used at a specific location in the network was properly documented at installation, this information may get lost over time e.g. due to mergers, fire, replacement of defect valves or other. And since the valves typically are located on the buried pipes it is often difficult to subsequently identify the specific valve type without having to unearth it.

From European patent no. 0 788 573 it is known to read identification information from a sealed electronic package in the valve by means of a key used for engaging an operating device on the valve to change the status—i.e. open or closed—of the buried valve. But valves are buried at very different depths and keys of many different lengths will therefore have to be used in the same network.

From German patent application no. 10 2009 019 984 it is therefore known to provide a buried valve with an extension spindle at installation. The extension spindle enables that the valve can be operated from the ground surface no matter how deep it is buried. The valve is furthermore provided with RFID (Radio Frequency Identification) chips provided with antenna means enabling that valve identification information can be wirelessly read from the ground surface. However, such wireless transmission is vulnerable particularly in light of the relatively long lifespan of a typical valve. Furthermore, such wireless communication is only one-way.

BRIEF SUMMARY

The invention provides for a valve arrangement for underground control of a fluid flow. The valve arrangement comprises a valve including a valve housing containing fluid control means for controlling a flow of fluid through pipe means arranged below the surface of the ground. The fluid control means is actuated by means of mechanical manipulation of an operating device of the valve and the operating device is coupled to the fluid control means. The valve further comprises valve identification means including data regarding the specific valve type. The valve arrangement also includes an extension device comprising an extension device housing substantially surrounding an extension rod, wherein the extension rod is rotatably supported by the extension device housing. The extension rod is mechanically coupled to the operating device to enable the mechanical manipulation being performed at the ground surface, wherein the extension device further comprises dedicated connection means extending between a valve end and a ground surface end of the extension device. The valve end is arranged at the valve housing and the ground surface end is arranged at the opposite end of the extension device, wherein the dedicated connection means enable that the data regarding the specific valve type may be communicated to the ground surface.

Providing the extension device with dedicated connection means extending substantially the length of the extension device is advantageous in that such physical connection means are less vulnerable—thus enabling a more durable way of identifying the valve.

Furthermore, such physical connection means also enables two-way communication, transmission, conduction or other or at least enables that the direction may be freely chosen. This is advantageous in that this enables that e.g. power may be supplied to the valve enabling that data regarding the specific valve type may be communicated to the ground surface either in the opposite direction through the connection means or via other communication means such as wireless transmission.

It should be noted that in this context the term "dedicated connection means" should be understood as any kind of dedicated connector—such as any kind of electrical conductor, optical conductor—such as an optical fibre cable—audio conductor or other means capable of conducting data or at least energy typically in the form of electrical power.

The term "fluid control means" is in this context to be understood as any kind of gate, hatch, ball or any other kind of blocking device suitable for controlling the flow of fluid through a valve arranged below the surface of the ground.

The term "pipe means" is in this context to be understood as any kind of tube, channel, conduit or any other kind of pipe suitable for conducting or at least holding a fluid.

The term "valve identification means" is in this context to be understood as any kind of label, RFID tag, EPROM (Erasable Programmable Read Only Memory) or any other kind of manual or electrical means capable of holding information regarding the specific valve type.

In an aspect of the invention, the valve arrangement further comprises a connection means coupling arranged to connect the valve identification means and the dedicated connection means between the valve and the extension device.

Providing the valve arrangement with a connection means coupling arranged to connect the valve identification means—either directly or through some further valve conductor means on the valve—to the dedicated connection means between the valve and the extension device is advantageous in that it enables onsite assembly of the valve and the extension device. I.e. if no connection means coupling was present the dedicated connection means would in principle have to extend all the way from the valve identification means to the top of the extension device making it impossible or at least difficult to fit the right type (typically length) of extension device to the valve onsite.

In an aspect of the invention, the dedicated connection means comprises conducting means for conducting electrical signals and/or power.

Using conducting means as dedicated connection means is advantageous in that conducting means enables that not only data can be conducted but also electrical power may be conducted by through the dedicated connection means.

The term "conducting means" is in this context to be understood as any kind of wire, cord, lead, cable or any other kind of conductor suitable for conducting electrical signals and/or power.

In an aspect of the invention, the connection means coupling is arranged at a transition area between the valve and the extension device.

Arranging the connection means coupling between the valve and the extension device is advantageous in that it simplifies the assembly of the two and makes it easier to protect the connection means coupling.

In an aspect of the invention, the connection means coupling is rigidly connected to the valve and the extension device.

Connecting the connection means coupling rigidly to the valve and the extension device is advantageous in that it ensures a specific location of the coupling. Furthermore, this design enables that the coupling may be engaged when the valve and the extension device is engaged—thus, simplifying installation.

In an aspect of the invention, the connection means coupling is formed separate from the valve and the extension device.

Arranging the connection means separate from the valve and the extension device is advantageous in that the coupling then may be engaged, repaired or other separate from the valve and the extension device.

In an aspect of the invention, the valve identification means is a RFID tag in that RFID tags are well proven and inexpensive means for holding data for a long period of time.

In an aspect of the invention, the valve identification means is powered by a power source arranged at the valve.

Arranging a power source at or on the valve is advantageous in that power to extract or transmit the data from the valve identification means is always readily available. A power source on the valve also enables that only data has to be transmitted to the ground surface—which then e.g. can be done by means of optical fibre cable, wirelessly or by other means not demanding an electrical conductor.

In an aspect of the invention, the valve identification means is powered trough the dedicated connection means from an external power source.

As previously explained the valve may be in use for several decades and it is therefore not certain that a local power source at the valve will function properly through the entire life of the valve. It is therefore advantageous to use an external power source and then power the valve identification means trough the dedicated connection means.

In an aspect of the invention, the valve arrangement further comprises power conducting means for conducting power from an external power source to the valve identification means.

Providing the valve arrangement with power conducting means—separate from the dedicated connection means—is advantageous in that it enables that the dedicated connection means may be optimised for its specific purpose of communicating data to the ground surface—i.e. the dedicated connection means may be formed as an optical fibre cable or other.

In an aspect of the invention, the extension device comprises impulse means arranged to generate an electrical impulse from power from an external power source.

Providing the extension device with impulse means enables that the valve identification means may be powered by a wireless electrical impulse generated relatively close to the valve identification means—thus, reducing the risk of faults and reducing the power consumption.

In an aspect of the invention, the valve arrangement comprises fastening means such as cotters, pins, screws, bolts or clamping devices for connecting the valve and the extension device together.

Connecting the valve and the extension device by means of fastening means is advantageous in that it enables easy onsite assembly and it enables that the valve and the extension device may easily be disassembled e.g. in case of repair, inspection or other.

In an aspect of the invention, the connection means coupling comprises matching plug means and socket means.

Enabling the connection means coupling by means of a plug and a socket is advantageous in that it provides for a simple and inexpensive coupling.

In an aspect of the invention, the valve further comprises valve status means for detecting an operating status of the valve.

Detecting operating statuses such as open/closed, flow rate, passed amount, temperature or other by means of valve status means is advantageous in that it enables that further and more current information regarding the valve may be detected and transmitted.

In an aspect of the invention, the valve arrangement further comprises valve status communication means for communicating the operating status of the valve to the dedicated connection means, which is advantageous in that using the readily available dedicated connection means provides simple and inexpensive means for transmitting the information to the ground surface.

In an aspect of the invention, the valve further comprises data logging means for logging data regarding the operation of the valve and in an aspect of the invention, the valve arrangement further comprises data logging communication means for communicating the logged data of the valve to the dedicated connection means.

Logging data and transmitting them through the readily available dedicated connection means provides simple and inexpensive means for transmitting the information to the ground surface.

In an aspect of the invention, the length of said extension device is between 100 mm and 10,000 mm, preferably between 200 mm and 8,000 mm and most preferred between 300 mm and 6,000 mm.

If the extension device is too short the valve may just as well be accessed directly without an extension device. However if the extension device is too long it will have to be very big and rigid to ensure that the mechanical manipulation is transmitted problem-free.

In an aspect of the invention, the dedicated connection means are arranged on or in the extension device housing.

Arranging the dedicated connection means on or in the extension device housing is advantageous in that it enables that the dedicated connection means may be properly protected.

In an aspect of the invention, the dedicated connection means are arranged on or in the extension rod.

The extension rod is arranged inside extension device housing and arranging the dedicated connection means on or in the extension rod therefore enables that the dedicated connection means are properly protected.

In an aspect of the invention, the extension device comprising bearing means arranged between the extension device housing and the extension rod to enable said rotatable support.

Hereby is achieved an advantageous embodiment of the invention.

In an aspect of the invention, the extension device comprising ground surface end bearing means and valve end bearing means arranged at opposite ends of the extension device between the extension device housing and the extension rod to enable said rotatable support.

Such bearing means enables low friction and better control when the extension device is used for manipulating the valve e.g. by rotating the extension rod to rotate the operating device of the valve.

In an aspect of the invention, the valve identification means is integrated in the valve housing.

Integrating the valve identification means in the valve housing ensures that the valve identification means are well protected.

In an aspect of the invention, the valve identification means is mounted on a surface of the valve housing.

Mounting the valve identification means on a surface of the valve housing is advantageous in that the data of the valve identification means is thereby easily accessible.

The invention further provides for a method for identifying an underground valve of a valve arrangement comprising an extension device being connected to the valve. The method comprises the steps of:

- coupling an identity reading device to a ground surface end of the extension device, wherein the ground surface end of the extension device is arranged opposite an valve end of the extension device and wherein the valve end is connected to the valve,
- exchanging signals and/or electrical power between the identity reading device and the valve identification means of the valve through dedicated connection means extending between the valve end and a ground surface end of the extension device so that data of the valve identification means may be read by means of the identity reading device, and
- disconnecting the identity reading device from the extension device.

Forming the valve arrangement so that the identity of the valve may be detected by means of an external identity reading device is advantageous in that it reduces the cost of the individual valve arrangements. And enabling that signals and/or electrical power is exchanged between the identity reading device and the valve identification means through the dedicated connection means is advantageous in that it ensures safe and durable conduction of the signals and/or power.

In an aspect of the invention, the method further comprises the step of supplying power to the valve identification means at least during the reading of the data.

Supplying external electrical power to the valve identification means enables that more and more complex information may be transmitted to the ground surface.

In an aspect of the invention, the method further comprises the step of activating a power source arranged at the valve at least during the reading of the data.

Activating a power source arranged at the valve is advantageous in that no power will have to be supplied to the valve from the ground surface—thus, enabling that the dedicated connection means may be formed simpler.

In an aspect of the invention, the method is a method for identifying an underground valve of a valve arrangement according to any of the previously mentioned valve arrangements.

Even further the invention provides for use of valve arrangement according to any of the previously mentioned valve arrangements for ground surface control of a fluid flow in underground pipe means.

It is advantageous to use a valve arrangement according to the present invention for ground surface control of a fluid flow in underground pipe means in that the identity of the valve hereby easily can be checked even may years after installation.

FIGURES

Figures 2, 3:
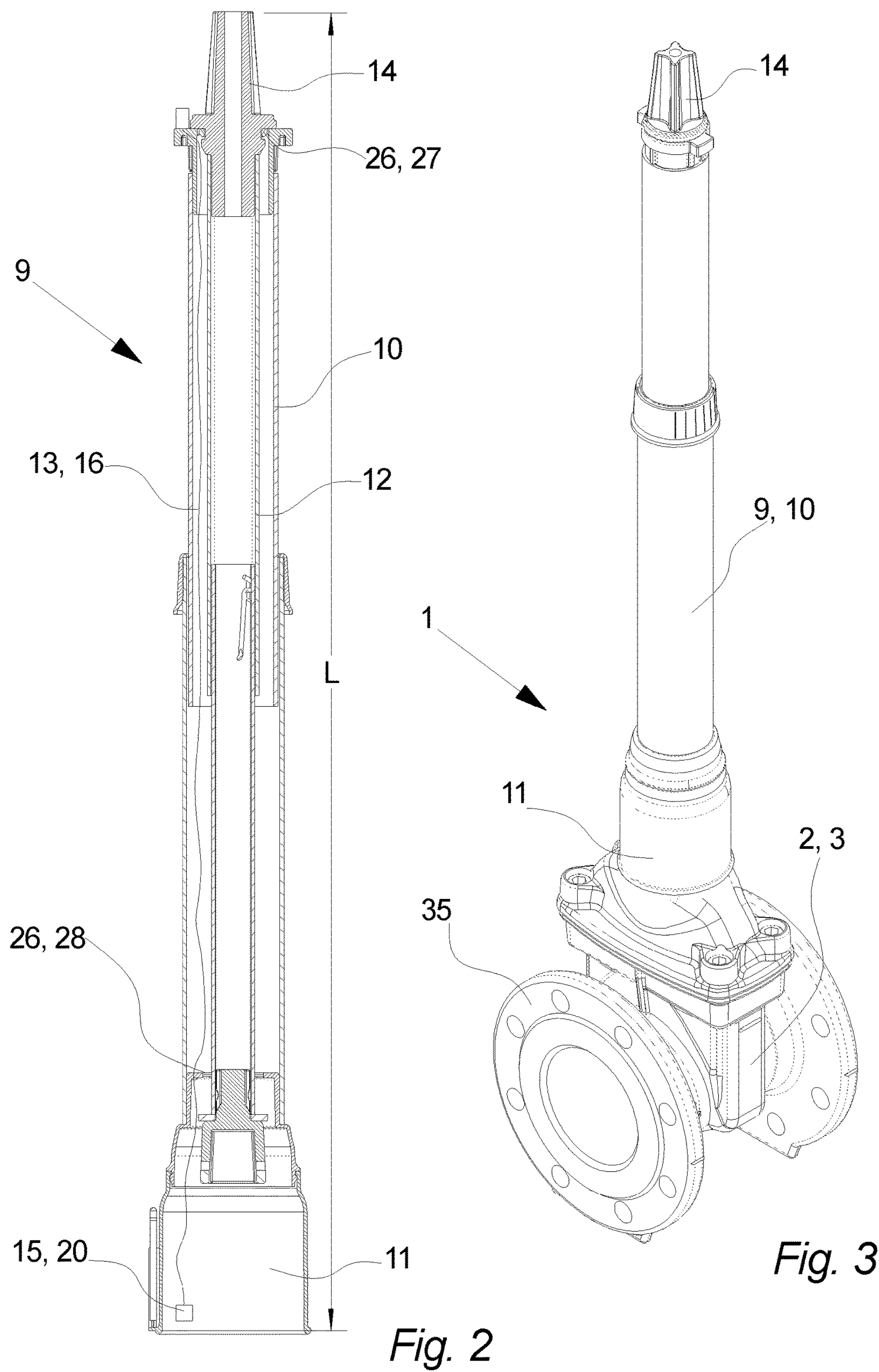
Figure 4:
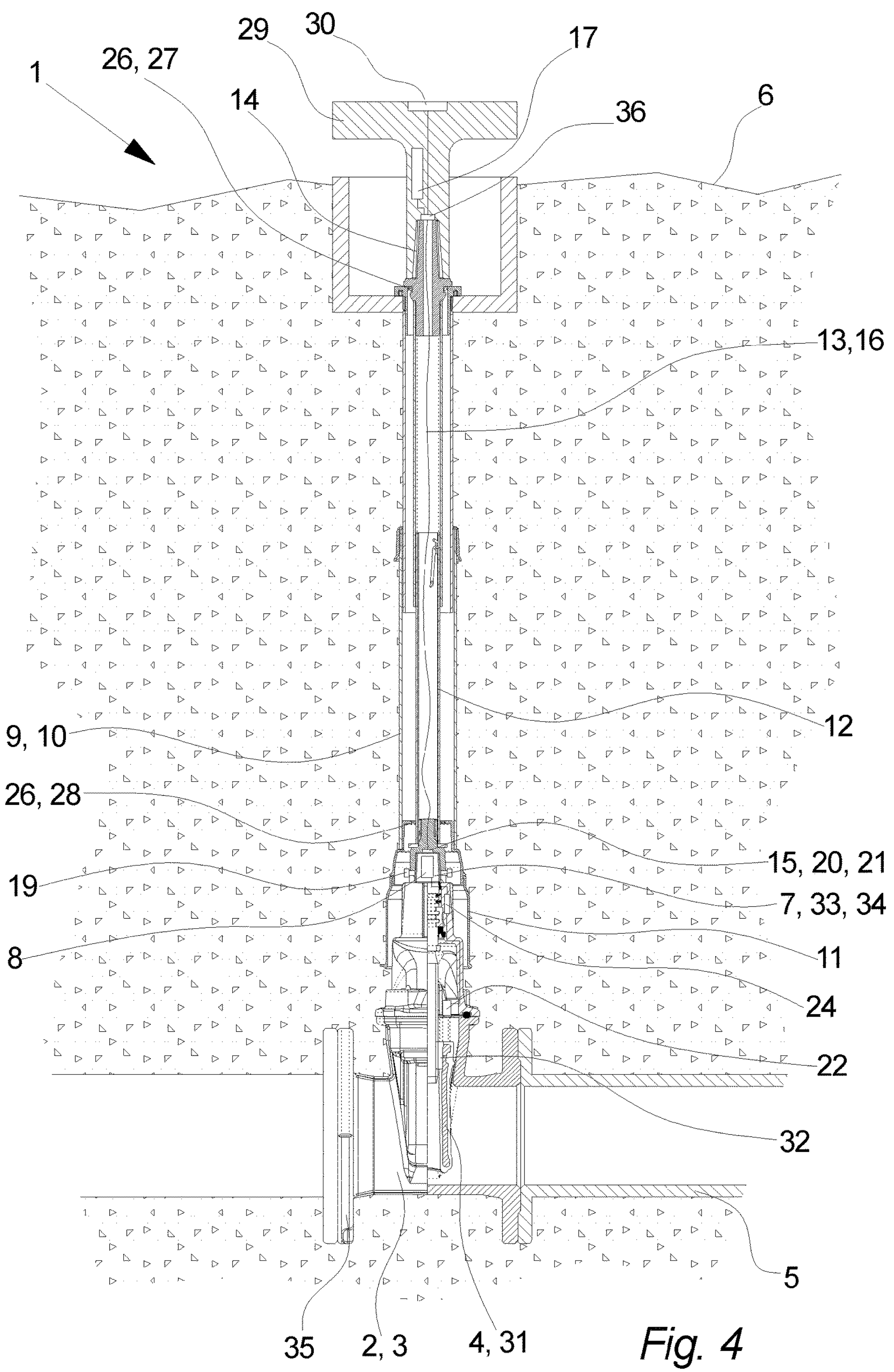

An embodiment of the invention will be described, by way of non-limiting example, in the following with reference to the figures in which:

FIG. 1 illustrates a partial cross section through the middle of a valve, as seen from the side, FIG. 2 illustrates a cross section through the middle of an extension device, as seen from the side, FIG. 3 illustrates a valve arrangement, as seen in perspective, and FIG. 4 illustrates a cross section through a valve arrangement during reading of data, as seen from the side.

DETAILED DESCRIPTION

FIG. 1 illustrates a partial cross section through the middle of a valve 2, as seen from the side.

In this embodiment the valve 2 comprises fluid control means 4 in the form of a vertically displaceable wedge 31 comprising a wedge nut 32. The valve 2 also comprises an operating device 7 in the form of a substantially centrally arranged spindle 33 engaging the wedge nut 32 at one end and at the other end is arranged a valve engaging device 34 enabling that the operating device 7 may be mechanical manipulated—i.e. in this case rotated—so that the nut 32 and thereby the wedge 31 is raised or lowered to open or close the valve 2 or at least control the clearance through the valve 2 to control the flow of a fluid through the valve 2.

However, in another embodiment the valve 2 could be a butterfly valve, a check valve, a ball valve or another type of valve 2 suited for controlling a flow of fluid through pipe means 5 to which the valve 2 is connected—i.e. in another embodiment the fluid control means 4 could comprise a disc, a flap, a ball, a hatch, a plug or other.

Also in another embodiment the operating device 7 could comprise a lever, a handle, a wheel or other and/or the valve engaging device 34 could comprise another external shape and/or an internal shape suited for being engaged so that the valve 2 may be manipulated in order to actuate the fluid control means 4.

In this embodiment the valve 2 comprises a valve housing 3 which in this case is provided with flanges 35 at both ends in order to easily and securely connect the valve 2 to pipe means 5. However, it is obvious to the skilled person that in another embodiment the connection between the valve 2 and the pipe means 5 could be formed differently.

In this embodiment the valve 2 comprises valve identification means 8 in the form of a passive RFID tag incorporated in the top of the spindle 33.

A passive RFID tag does not comprise any power source or transmitting device. When the passive RFID tag is exposed to the right kind of radio waves the waves are converted to energy enabling that the tag may send information to a reader.

However, in another embodiment the valve identification means 8 could be an active RFID tag comprising its own transmitting device and either an internal or external power source or a battery-assisted passive (BAP) RFID tag having a small battery on board or nearby which can be activated e.g. by in response to an electrical signal or when in a RFID reader is nearby.

The valve identification means 8 could also or instead comprise other forms of microchips, other kinds of electronic circuits or the valve identification means 8 could also or instead comprise passive means such as labels or other means for some sort of visual reading, means for audial ID storage or any of an number of means for storing valve ID on the valve 2. And in another embodiment the valve identification means 8 could be located elsewhere in or on the valve, such as on an outside surface, on an inside surface, incorporated in the valve housing 3, incorporated in an internal or external component of the valve 2 or other.

In this embodiment the valve identification means 8 comprises data regarding the specific valve type in the form of an EPC number (Electronic Product Code) but in another embodiment the data could be in another form such as the valve name, a type specification, a code or other.

In this embodiment the valve 2 further comprises valve status means 22 in the form of a position sensor arranged to detect the position (or status) of the wedge 31 in the valve 2. However, in another embodiment the valve status means 22 could instead or also be arranged for detecting another operating status of the valve 2, such as temperature, pH-level, leak detection or other.

In this embodiment the valve 2 further comprises data logging means 24 enabling that data collected from the valve status means 22 is logged and stored for later extraction e.g. along with the data of the valve identification means 8.

In this embodiment the valve 2 also comprises valve status communication means 23 enabling that the operating status of the valve 2 can be communicated to the ground surface and data logging communication means 25 enabling that the logged data can be communicated to the ground surface.

In this embodiment the valve status communication means 23 and the data logging communication means 25 are simple wires electrically connecting the valve status means 22 and the data logging means 24 to the valve identification means 8—so that the data of the valve status means 22 and/or the data logging means 24 may be extracted along with the data of the valve identification means 8—but in another embodiment valve status communication means 23 and/or the data logging communication means 25 could form an independent connection to the dedicated connection means 13 (to be explained further in relation with FIGS. 2 and 3).

FIG. 2 illustrates a cross section through the middle of an extension device 9, as seen from the side.

In this embodiment the extension device 9 comprising an extension device housing 10 substantially surrounding an inner extension rod 12. At the upper ground surface end 14 of the extension device 9 the extension rod 12 extends up and out of the extension device housing 10 to enable that the ground surface end 14 of the extension device 9 may easily be accessed and manipulated.

However in another embodiment the ground surface end 14 of the extension device 9 may also or instead be formed with an internal shape or other enabling that the ground surface end 14 of the extension rod 12 may be engaged to manipulate the operating device 7 of the valve 2.

At the lower valve end 11 of the extension device 9 the extension device housing 10 extends a little further than the inner extension rod 12 to protect the top of the valve 2 as disclosed in FIGS. 3 and 4.

In this embodiment the position of the extension rod 12 in relation to the extension device housing 10 is controlled by means of bearing means 26 in the form of a ground surface end bearing means 27 and a valve end bearing means 28 arranged at opposite ends 11, 14 of said extension device 9. In this embodiment both bearing means 27, 28 are very simple journal bearings formed by engaging shapes of the extension rod 12 and the extension device housing 10. However in another embodiment the bearing means 26 could be e single bearing e.g. arranged at the ground surface end 14 or the middle of the extension device 9 and/or the bearing means 26 could also or instead comprise roller bearing, ball bearings or the bearings could be enabled in another way enabling that the extension rod 12 may rotate in relation to the extension device housing 10.

In this embodiment both the extension rod 12 and the extension device housing 10 are formed telescopic in that a top part of the extension rod 12 and the extension device housing 10 is arranged to slide in and out of the bottom part. I.e. in this embodiment the extension device 9 can be arranged to be formed with a length between 650 and 1100 millimeters but in another embodiment the telescopic part of the extension device 9 could be arranged to extend less or more or the extension device 9 could be formed with a fixed length so that the length of the extension device 9 would be adapted onsite e.g. by means of a saw.

In this embodiment the extension device 9 further comprises dedicated connection means 13 in the form of an electrical conductor extending substantially the entire length of the extension device 9—i.e. between the valve end 11 and the ground surface end 14 of the extension device 9.

At the ground surface end 14 of the extension device 9, the dedicated connection means 13 is connected to a ground surface end transmission means 36 which in this embodiment is a plug enabling that the dedicated connection means 13 may easily be connected to an identity reading device 29 (see FIG. 4). However in another embodiment the ground surface end transmission means 36 could be a socket or some sort of surface suited for establishing a electrical, visual, audial or another form of connection or the ground surface end transmission means 36 could comprise means for transmitting wirelessly to the identity reading device 29 (see FIG. 4).

At the valve end 11 the dedicated connection means 13 is connected to a part of a connection means coupling 15 which in this case is lose plug means 20 arranged to be connected to socket means 21 of the valve 2.

In this embodiment the dedicated connection means 13 is arranged between the extension rod 12 and the extension device housing 10 and substantially not attached to either (except at the ground surface end 14), but in another embodiment the dedicated connection means 13 would be connected to one or both of the extension rod 12 and the extension device housing 10 and/or the dedicated connection means 13 would be at least partially integrated in one or both of the extension rod 12 and the extension device housing 10.

FIG. 3 illustrates a valve arrangement 1, as seen in perspective and FIG. 4 illustrates a cross section through a valve arrangement 1 during reading of data, as seen from the side.

In this embodiment the extension device 9 is connected to the valve 2 by means of a fastening means 19 in the form of a locking pin extending transversal through the engaging parts of the extension rod 12 and the valve engaging device 34. However in another embodiment the two could be connected differently e.g. by also or instead connecting the extension device housing 10 to the valve housing 3 or other.

In this embodiment the dedicated connection means 13 is arranged inside the extension rod 12 and a connection means coupling 15—of the plug and socket type—is arranged at the end of the extension rod 12 at the transition area between the valve 2 and the extension device 9 so that when the extension rod 12 is connected to the operating device 7 of the valve 2 the dedicated connection means 13 is also connected to the valve identification means 8.

However, in another embodiment the extension device 9 could comprise impulse means 18 arranged at the valve end 11 to generate an electrical impulse from power from power source 17 arranged at the identity reading device 29 thus activating the valve identification means to communicate data to the identity reading device 29.

As mentioned above the valve arrangement 1 is in this embodiment provided with an identity reading device 29 at the ground surface end 14 of the extension device 9. In this embodiment the identity reading device 29 has two functions: it reads the identity of the valve 2 and it can manipulate the extension device to manipulate the status of the valve 2. However in another embodiment the identity reading device 29 would only be used for reading the identity of the valve 2 and e.g. reading the valve status means 22 and/or the data logging means 24.

In this embodiment the underground valve 2 is identified by connecting an identity reading device 29 to a ground surface end 14 of the extension device 9. The identity reading device 29 sends an electrical power impulse down to the valve identification means 8 on the valve 2 through the dedicated connection means 13 so that the data regarding the identity of the valve 2 is returned from the valve identification means 8 and upwards to the identity reading device 29 where the data in this case is displayed on a display 30 of the identity reading device 29. In another embodiment the identity reading device 29 would also or instead instead be provided with means for communicating the data to another location or be provided with storage means enabling that the data could be read later.

In another embodiment the identity reading device 29 would only be provided with means for supplying power to the valve identification means 8 through the dedicated connection means 13 which in turn will generate a wireless signal comprising the identity data which will be read by the identity reading device 29.

Or the valve identification means 8 could comprise its own powers source and the identity reading device 29 would then—through the dedicated connection means 13—trigger that power from this power source on the valve 2 would supply power to the valve identification means 8 which in turn will send a signal through the dedicated connection means 13 or generate a wireless signal comprising the identity data which will be read by the identity reading device 29.

If both electrical power and data is exchanged between the valve identification means 8 and the identity reading device 29 the extension device could comprise a dedicated connection means 13 for each.

Once the identity of the valve has been read the identity reading device 29 is disconnected from the extension device 9 so that the same identity reading device 29 may be used at another valve arrangement without having to be modified.

The invention has been exemplified above with reference to specific examples of valves 2, valve identification means 8, extension devices 9 and other. However, it should be understood that the invention is not limited to the particular examples described above but may be designed and altered in a multitude of varieties within the scope of the invention as specified in the claims.

The invention claimed is:

1. A valve arrangement for underground control of a fluid flow, said valve arrangement comprising:

a valve including a valve housing containing a gate for controlling a flow of fluid through a channel arranged below the surface of the ground, wherein said gate is actuated by means of mechanical manipulation of an operating device of said valve, said operating device being coupled to said gate, and wherein said valve further comprises a valve identification tag including data regarding the specific valve type, an extension device comprising an extension device housing substantially surrounding an extension rod, wherein said extension rod is rotatably supported by said extension device housing, said extension rod being mechanically coupled to said operating device to enable said mechanical manipulation being performed at said ground surface, wherein said extension device further comprises a conductor extending between a valve end and a ground surface end of said extension device, said valve end being arranged at said valve housing and said ground surface end being arranged at the opposite end of said extension device, wherein said conductor is configured to exchange signals between an identity reading device at said ground surface and said valve identification tag to enable that said data regarding said specific valve type may be communicated to said ground surface, and wherein said conductor is directly arranged on or in said extension device housing.

2. A valve arrangement according to claim 1, wherein said valve arrangement further comprises a connection coupling arranged to connect said valve identification tag and said conductor between said valve and said extension device.

3. A valve arrangement according to claim 2, wherein said connection coupling is arranged at a transition area between said valve and said extension device.

4. A valve arrangement according to claim 2, wherein said connection coupling is rigidly connected to said valve and said extension device.

5. A valve arrangement according to claim 2, wherein said connection coupling is formed separate from said valve and said extension device.

6. A valve arrangement according to claim 2, wherein said connection coupling comprises a matching plug and a socket.

7. A valve arrangement according to claim 1, wherein said conductor comprises conducting means for conducting electrical signals and/or power.

8. A valve arrangement according to claim 1, wherein said valve identification tag is a RFID tag.

9. A valve arrangement according to claim 1, wherein said valve identification tag is powered by a power source arranged at said valve.

10. A valve arrangement according to claim 1, wherein said valve identification tag is powered trough said conductor from an external power source.

11. A valve arrangement according to claim 1, wherein said valve arrangement further comprises power conducting means for conducting power from an external power source to said valve identification tag.

12. A valve arrangement according to claim 1, wherein said extension device comprises impulse means arranged to generate an electrical impulse power from an external power source.

13. A valve arrangement according to claim 1, wherein said valve arrangement comprises fastening devices for connecting said valve and said extension device together.

14. A valve arrangement according to claim 1, wherein said valve further comprises valve status means for detecting an operating status of said valve.

15. A valve arrangement according to claim 14, wherein said valve arrangement further comprises valve status communication means for communicating said operating status of said valve to said conductor.

16. A valve arrangement according to claim 1, wherein said valve further comprises data logging means for logging data regarding the operation of said valve.

17. A valve arrangement according to claim 16, wherein said valve arrangement further comprises data logging communication means for communicating said logged data of said valve to said conductor.

18. A valve arrangement according to claim 1, wherein the length of said extension device is between about 100 mm and about 10,000 mm.

19. A valve arrangement according to claim 1, wherein said conductor is arranged on or in said extension rod.

20. A valve arrangement according to claim 1, wherein said extension device comprising bearing means arranged between said extension device housing and said extension rod to enable said rotatable support.

21. A valve arrangement according to claim 1, wherein said extension device comprising ground surface end bearing means and valve end bearing means arranged at opposite ends of said extension device between said extension device housing and said extension rod to enable said rotatable support.

22. A valve arrangement according to claim 1, wherein said valve identification tag is integrated in said valve housing.

23. A valve arrangement according to claim 1, wherein said valve identification tag is mounted on a surface of said valve housing.

24. A valve arrangement according to claim 1, configured for ground surface control of a fluid flow in an underground channel.

25. A method for identifying an underground valve of a valve arrangement comprising an extension device being connected to said valve, said method comprising the steps of:

coupling an identity reading device to a ground surface end of said extension device, wherein said ground surface end of said extension device is arranged opposite an valve end of said extension device, wherein said valve end is connected to said valve, exchanging signals and/or electrical power between said identity reading device and a valve identification tag of said valve through a conductor extending between said valve end and said ground surface end of said extension device so that data of said valve identification tag may be read by means of said identity reading device, and disconnecting said identity reading device from said extension device.

26. A method according to claim 25, wherein said method further comprises the step of supplying power to said valve identification tag at least during said reading of said data.

27. A method according to claim 25, wherein said method further comprises the step of activating a power source arranged at said valve at least during said reading of said data.

28. A method according to claim 25, wherein said method is a method for identifying an underground valve of a valve arrangement.

* * * * *